United States Patent
Nam Goong et al.

(10) Patent No.: US 10,824,268 B2
(45) Date of Patent: *Nov. 3, 2020

(54) METHOD AND APPARATUS FOR PROVIDING USER KEYPAD IN A PORTABLE TERMINAL

(71) Applicant: Samsung Electronics Co., Ltd., Suwon-si, Gyeonggi-do (KR)

(72) Inventors: Bo Ram Nam Goong, Seoul (KR); Hwang Joon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/905,091

(22) Filed: Jun. 18, 2020

(65) Prior Publication Data

US 2020/0319746 A1    Oct. 8, 2020

Related U.S. Application Data

(63) Continuation of application No. 16/582,479, filed on Sep. 25, 2019, now Pat. No. 10,705,652, which is a continuation of application No. 14/166,358, filed on Jan. 28, 2014, now abandoned, which is a continuation of application No. 13/314,426, filed on Dec. 8, 2011, now Pat. No. 9,244,563.

(30) Foreign Application Priority Data

Dec. 10, 2010 (KR) .................. 10-2010-0126146

(51) Int. Cl.
*G06F 3/041* (2006.01)
*G06F 3/0488* (2013.01)

(52) U.S. Cl.
CPC ........ *G06F 3/0416* (2013.01); *G06F 3/04886* (2013.01)

(58) Field of Classification Search
CPC .......................... G06F 3/0416; G06F 3/04886
See application file for complete search history.

(56) References Cited

U.S. PATENT DOCUMENTS

| | | | |
|---|---|---|---|
| 7,970,438 B2 | 6/2011 | Yoon et al. | |
| 8,300,023 B2 | 10/2012 | Forutanpour et al. | |
| 9,218,021 B2* | 12/2015 | Sirpal | G06F 1/1647 |
| 9,261,913 B2 | 2/2016 | Mittal et al. | |
| 2003/0112277 A1* | 6/2003 | Shteyn | G06F 3/0233 |
| | | | 715/773 |

(Continued)

FOREIGN PATENT DOCUMENTS

| | | | |
|---|---|---|---|
| JP | 2001-175392 A | 6/2001 | |
| JP | 2005-115808 A | 6/2005 | |

(Continued)

*Primary Examiner* — Ibrahim A Khan
(74) *Attorney, Agent, or Firm* — Jefferson IP Law, LLP (57) ABSTRACT

A method of providing a user defined user keypad and a mobile terminal supporting the same are provided. The method includes displaying guide information when entering a user keypad setting mode, determining a designation range for the user keypad according to a user interaction inputted based on the guide information, computing a key arrangement of the user keypad in response to the determined range, and configuring the user keypad according to the computed key arrangement.

25 Claims, 7 Drawing Sheets

(56) References Cited

U.S. PATENT DOCUMENTS

| | | | |
|---|---|---|---|
| 2005/0162402 A1* | 7/2005 | Watanachote | G06F 3/04886 345/173 |
| 2005/0206730 A1* | 9/2005 | Hagiwara | G06F 3/0426 348/169 |
| 2005/0225538 A1 | 10/2005 | Verhaegh | |
| 2005/0248525 A1 | 11/2005 | Asai | |
| 2008/0048986 A1* | 2/2008 | Khoo | G06F 1/1615 345/168 |
| 2008/0318635 A1* | 12/2008 | Yoon | G06F 1/169 455/566 |
| 2009/0007001 A1* | 1/2009 | Morin | G06F 3/0346 715/773 |
| 2009/0058815 A1* | 3/2009 | Jeon | G06F 1/1643 345/169 |
| 2009/0066659 A1 | 3/2009 | He et al. | |
| 2009/0237359 A1 | 9/2009 | Kim et al. | |
| 2009/0237361 A1* | 9/2009 | Mosby | G06F 3/04886 345/173 |
| 2010/0097321 A1 | 4/2010 | Son et al. | |
| 2010/0241985 A1* | 9/2010 | Kim | G06F 3/04886 715/773 |
| 2010/0259561 A1* | 10/2010 | Forutanpour | G06F 3/0237 345/660 |
| 2010/0277414 A1* | 11/2010 | Tartz | G06F 3/0216 345/169 |
| 2011/0078567 A1* | 3/2011 | Kim | G06F 3/04886 715/702 |
| 2011/0109567 A1 | 5/2011 | Kim | |
| 2011/0163955 A1 | 7/2011 | Nasiri et al. | |
| 2011/0242138 A1* | 10/2011 | Tribble | G06F 3/04886 345/663 |
| 2011/0310019 A1* | 12/2011 | Wilson | G06F 3/0238 345/168 |
| 2012/0032877 A1 | 2/2012 | Watkins, Jr. et al. | |
| 2012/0075194 A1* | 3/2012 | Ferren | G06F 3/0236 345/168 |
| 2012/0113007 A1* | 5/2012 | Koch | G06F 3/0488 345/168 |
| 2012/0117506 A1* | 5/2012 | Koch | G06F 3/04886 715/773 |

FOREIGN PATENT DOCUMENTS

| | | |
|---|---|---|
| KR | 10-2008-0073921 A | 8/2008 |
| KR | 10-2009-0034216 A | 4/2009 |
| KR | 10-2009-0063903 A | 6/2009 |
| KR | 10-2009-0101741 A | 9/2009 |
| KR | 20-2009-0010447 U | 10/2009 |
| KR | 10-1175348 B1 | 8/2012 |
| KR | 10-1545569 B1 | 8/2015 |

* cited by examiner

METHOD AND APPARATUS FOR PROVIDING USER KEYPAD IN A PORTABLE TERMINAL

PRIORITY

This application is a continuation of prior application Ser. No. 16/582,479, filed on Sep. 25, 2019, which is a continuation of prior application Ser. No. 14/166,358, filed on Jan. 28, 2014, which is a continuation of prior application Ser. No. 13/314,426, filed Dec. 8, 2011, which has issued as U.S. Pat. No. 9,244,563 on Jan. 26, 2016 and was based on and claimed priority under 35 U.S.C. § 119(a) of a Korean patent application filed on Dec. 10, 2010 in the Korean Intellectual Property Office and assigned Serial No. 10-2010-0126146, the entire disclosure of each of which is hereby incorporated by reference.

BACKGROUND OF THE INVENTION

1. Field of the Invention

The present invention relates to a method of providing a user defined user keypad and a mobile terminal supporting the same. More particularly, the present invention relates to a method of providing a user keypad which is capable of setting and operating a touch based user keypad according to user definition in an area having a range according to user designation and a mobile terminal supporting the same.

2. Description of the Related Art

Recently, due to the development of information and communication technology and semi-conductor technology, mobile terminals are widely used. Recent mobile terminals now include functionality of other types of terminals beyond the traditional functionality of mobile terminals. In addition to general telecommunication functions such as a voice communication and a short message service, various multimedia functions are being included, such as a TV function (e.g., mobile broadcasting like a Digital Multimedia Broadcasting (DMB) and a Digital Video Broadcasting (DVB)), a music play function (e.g., MPEG Audio Layer-3 (MP3)), a photographing function, an internet access function, and a dictionary search function.

Recent mobile terminals have been developed in such a manner that the size of the display unit is larger than the size of existing mobile terminals. For example, tablet Personal Computers (PC) are presently becoming popular. Accordingly, technology relating to the convenience of the user input mode should be developed in response to these changes. For example, when a user inputs a character using an existing keypad expanded according to the size of display unit in a mobile terminal such as the tablet PC, there exists a problem in that the user has to perform the input with one hand while holding the mobile terminal with the other hand, or has to perform the input with both hands while placing the mobile terminal on a table or other surface.

SUMMARY OF THE INVENTION

Aspects of the present invention are to address at least the above-mentioned problems and/or disadvantages and to provide at least the advantages described below. Accordingly, an aspect of the present invention is to provide a mobile terminal which is capable of setting a user defined user keypad in a mobile terminal supporting a touch based input interface and an operation method thereof.

Another aspect of the present invention is to provide a method and a mobile terminal for supporting a user setting based keypad for addressing a problem that user input of existing touch based keypad is inconvenient in a mobile terminal due to a size of a display unit.

Another aspect of the present invention is to provide a method and a mobile terminal for setting a range in which an input is possible according to user definition in a display unit of a mobile terminal, and to provide a touch based user keypad corresponding to user definition within a set range.

Another aspect of the present invention is to provide a method and a mobile terminal for improving usability and convenience of a mobile terminal by implementing a new input environment for user input in a mobile terminal.

In accordance with an aspect of the present invention, a method of providing a user keypad in a mobile terminal is provided. The method includes displaying guide information when entering a user keypad setting mode, determining a designation range for the user keypad according to a user interaction inputted based on the guide information, computing a key arrangement of the user keypad in response to the determined range, and configuring the user keypad according to the computed key arrangement.

In accordance with another aspect of the present invention, a computer-readable recording medium is provided on which a program for executing the method in a processor is recorded.

In accordance with another aspect of the present invention, a mobile terminal is provided. The mobile terminal includes a display unit for displaying guide information when setting a user keypad, and for displaying a touch based user keypad corresponding to a currently executing application, a storage unit for storing setting information related to the user keypad according to a user setting, and a controller for determining a designation range for the user keypad based on a user interaction inputted according to the guide information, and for configuring the user keypad according to a key arrangement computed in response to the determined range.

As described above, according to a user keypad providing method and apparatus in the mobile terminal suggested in aspects of the present invention, a convenience according to user input can be improved in the mobile terminal through the implementation of new input environment in response to a size increment of the display unit of the mobile terminal.

According to an aspect of the present invention, a touch based user keypad according to user definition can be set within a range that the user can designate.

According to an aspect of the present invention, it is possible to set a user keypad adjustable to each user as the size of the display unit and the size of the hand of each user are different.

According to an aspect of the present invention, the user keypad may be configured by various combinations according to the user's taste.

Moreover, the user keypad according to user setting may be automatically changed to a combination for optimum input environment and displayed in a currently executing application.

Aspects of the present invention may be implemented in all device types supporting user input using a touch based keypad.

Aspects of the present invention support an input environment optimized for each user using a mobile terminal, so that the usability, the convenience and the competitive power of the mobile terminal can be enhanced.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to a method and a mobile terminal for providing a touch based user defined user keypad. Exemplary embodiments of the present invention may configure a keypad optimized for an input environment of user according to the size of display unit and the size of a user's hand. Exemplary embodiments of the present invention may configure at least two keypad combinations which are separately configured when using a user defined user keypad, and may automatically change the combination of user keypad to a combination optimized for an executing application. Exemplary embodiments of the present invention may support a user input according to the change of posture information of the mobile terminal when using a user keypad.

Figure 1:
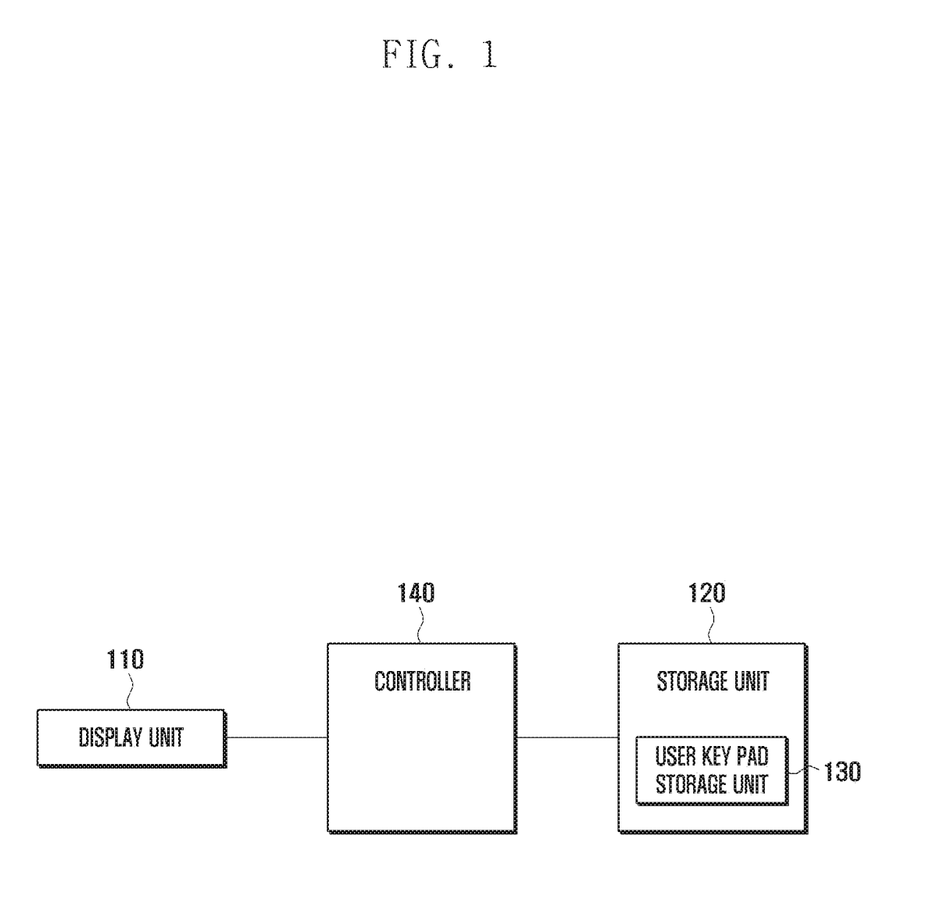
FIG. 1 is a block diagram illustrating a schematic configuration of a mobile terminal according to an exemplary embodiment of the present invention.

FIG. 1 is a block diagram illustrating a schematic configuration of a mobile terminal according to an exemplary embodiment of the present invention.

Referring to FIG. 1, the mobile terminal includes a display unit 110, a storage unit 120 and a controller 140. The mobile terminal may further include an audio processing unit equipped a microphone and a speaker, a digital broadcasting module for performing reception and playing of digital broadcasts (e.g., mobile broadcasting such as a Digital Multimedia Broadcasting (DMB) or a Digital Video Broadcasting (DVB)), a camera module for a photo/video function, a Bluetooth communication module for performing a Bluetooth telecommunication function, an internet communications module for performing an internet communications function, a touch pad for touch based input, an input unit supporting a physical key input, a sensing module (e.g., an acceleration sensor, a gyro sensor, or the like) for sensing a change of posture information of the mobile terminal, and a battery for supplying power to the above described elements, but the description and illustration of these components are omitted for clarity.

The display unit 110 provides an execution screen of applications supported by the mobile terminal as well as a home screen of the mobile terminal. For example, the display unit 110 provides an execution screen for a message function, an e-mail function, an internet function, a multimedia function, a search function, a telecommunication function, an electronic book (e.g., e-book) function, a photo/video function, a photo/video playing function, a TV function (e.g., a mobile broadcasting function such as DMB and DVB), a music playing function (e.g., a MP3 function), a widget function, a memo function, a game mode, or the like.

The display unit 110 typically uses a Liquid Crystal Display (LCD), but other display devices such as a Light Emitting Diode (LED), an Organic LED (OLED), and an Active Matrix OLED (AMOLED) may be used. The display unit 110 displays guide information for user keypad setting, and may indicate a user keypad which is configured according to user definition. When displaying the above described execution screen (e.g., execution screen including a touch based user key), the display unit 110 may provide a landscape mode or a portrait mode according to the rotational direction (or the placed direction) of the mobile terminal.

The display unit 110 may include an interface supporting a touch based input. For example, the display unit 110 may support a touch based user input with a touch-screen and generate an input signal according to the user input to send to the controller 140. Only a single display unit 110 is shown in FIG. 1, but exemplary embodiments of the present invention are not limited thereto. The mobile terminal may include two or more display units.

The storage unit 120 stores various programs and data which are executed and processed in the mobile terminal, and may be include one or more nonvolatile memories and volatile memories. The nonvolatile memory may include Read Only Memory (ROM), flash memory, or the like. The volatile memory may include Random Access Memory (RAM), or the like. The storage unit 120 may continuously or temporarily store an operating system of the mobile terminal, a program and data relating to a display control operation of the display unit 110, a program and data relating to an input control operation using the display unit 110, a program and data relating to a control operation for setting a user key, and a program and data relating to a control operation for supporting a user input according to posture information of mobile terminal. The storage unit 120 may also include a user keypad storage unit 130 which stores guide information for setting a user keypad, and various setting information relating to a user keypad configured according to user definition.

The controller 140 controls the overall operation of the mobile terminal. The controller 140 may control operations for supporting a customized keypad according to an exemplary embodiment of the present invention, i.e., a touch based user defined user keypad. For example, the controller 140 may control an operation relating to the setting of the location and the size of the keypad in response to user input. The controller 140 computes the key arrangement of the keypad in response to the range of keypad setting established by user, and configures the keypad according to the computed key arrangement.

The controller 140 may control the positioning of a specific key, a repositioning between specific keys and the key arrangement according to the positioning in the user keypad which is configured according to user definition. The controller 140 may control an operation relating to the function according to the detection of posture information of the mobile terminal in an input environment using user keypad. The controller 140 can extract and provide a user keypad configuration with an optimized combination for any application of the mobile terminal. Operation of the controller 140 is described below. In addition, the controller 140 may control various operations relating to a normal function of the mobile terminal. For example, the controller 140 may control the operation and data display in the execution of an application of the mobile terminal.

The controller 140 may receive an input signal corresponding to various input modes supported by a touch based input interface and can control a relevant function operation. For example, the controller 140 may control character display corresponding to user input using the touch based user keypad.

The mobile terminal may be a bar type, a folder-type, a slide type, a swing type, and a flip type. The mobile terminal may be any type of information and communication equipment, multimedia device, and application equipment. For example, the mobile terminal may be a tablet Personal Computer (PC), smart phone, Portable Multimedia Player (PMP), digital broadcasting player, Personal Digital Assistant (PDA), mobile game terminal, and electronic book terminal, as well as a mobile communications terminal operating based on respective communication protocols corresponding to various communications system.

Figure 2:
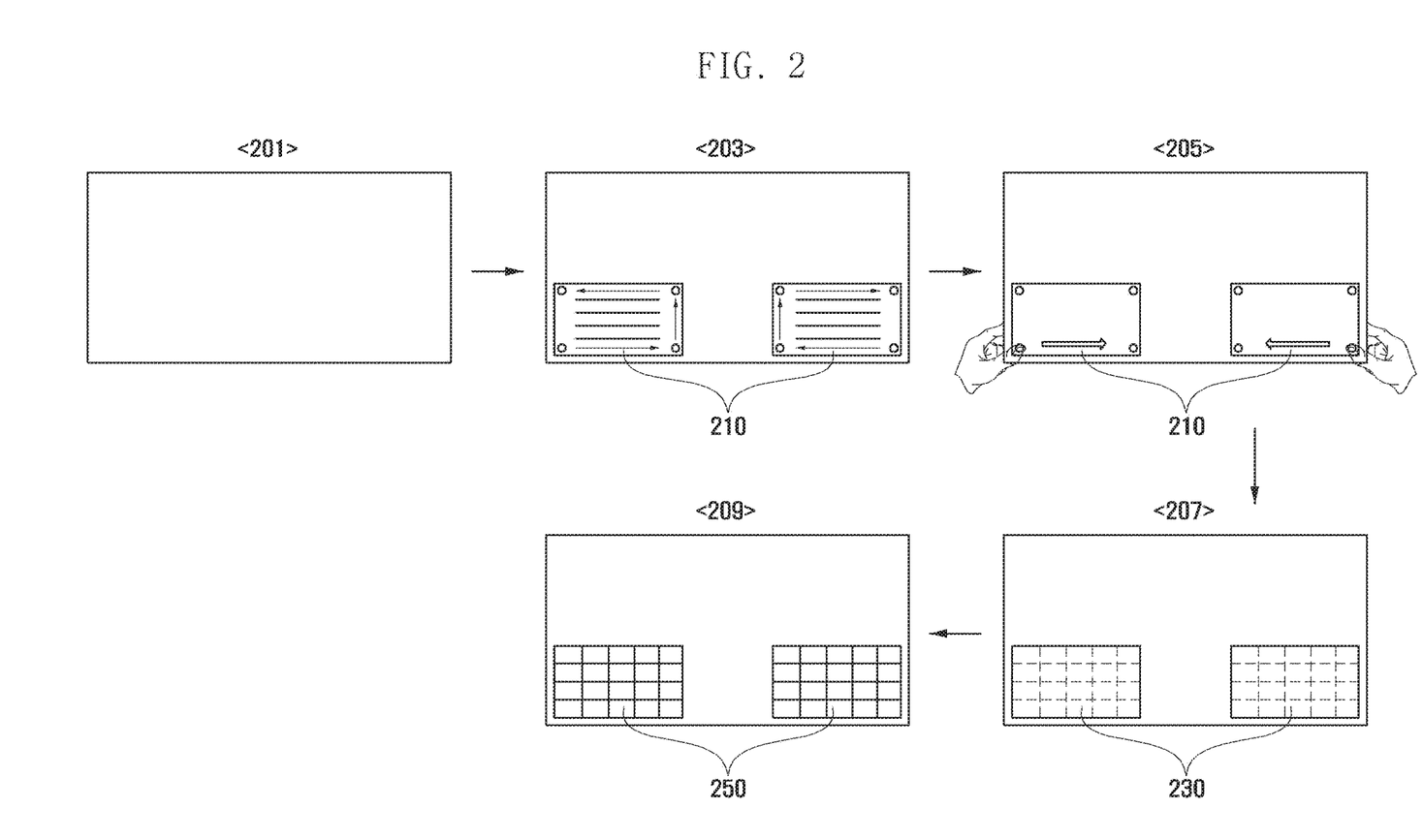
FIG. 2 illustrates an operation of setting a user defined user keypad in a mobile terminal according to an exemplary embodiment of the present invention.

FIG. 2 illustrates an operation of setting a user defined user keypad in a mobile terminal according to an exemplary embodiment of the present invention.

Referring to FIG. 2, reference numeral 201 shows the mobile terminal in a standby state, and displays a relevant screen. If the mobile terminal uses a specific mode according to the execution of a specific application or uses a home screen, relevant screen data can be displayed in reference numeral 201. In the state shown in reference numeral 201, the user may execute a keypad setting mode for a user keypad. For example, the user may input an interaction for executing the keypad setting mode through the operation of the mobile terminal.

As shown in reference numeral 203, the controller 140 can display an initial screen for the keypad setting. The initial screen for the keypad setting may correspond to a step of providing guide information 210. The guide information 210 may be displayed in both sides based on a screen center in response to the left hand and the right hand of user. The guide information 210 may be displayed in two classified areas. The guide information 210 includes information for the designation of an area in which the user can input by using a finger (e.g., the left hand thumb and the right hand thumb) through the classified area. The information for the designation of the area may include text (e.g., touch by thumb and move in an arrow direction), and an item (e.g., arrow).

In the state shown in reference numeral 203, the user may input an interaction for designation of an area according to the guide information. For example, the user may hold the mobile terminal by both hands (or place the mobile terminal on a desk). In this state, as shown in reference numeral 205, the user may separately or simultaneously input the interaction moving on each area which displays the guide information 210 in a range in which the user can input. In case of the left hand in reference numeral 205, the user may touch an initial location for the designation of range and move to a distance movable to the right side according to the guide information 210, move to a distance movable to the upper side from an initial point moved to the right side, move to a distance movable to the left side from an initial point moved to the upper side, and release the input. The controller 140 may trace a movement route of interaction and draw a virtual line according to the traced route to compute a rectangular area. The mobile distance may be different for each user, and may be a maximum distance that the input of the outer-most key of the keypad is possible according to the size of the hand of the user or may be an arbitrary distance which is arbitrarily drawn by the user.

When the range of the user is designated according to the user interaction, the controller 140 may configure and display a user keypad within a designated range as shown in reference numeral 207. The user keypad shown in reference numeral 207 may be a virtual keypad for the confirmation of the user, and may be omitted. The configuration of reference numeral 207 may confirm to that user whether the user keypad is appropriately configured according to the user's designation. The user may configure the keypad to have a more optimum range and key arrangement by re-designation through the above process.

When the virtual keypad is provided as shown in reference numeral 205, the controller 140 may recognize the designated range, and may compute the key arrangement which can be configured in both ranges of the right side and the left side. For example, the controller 140 may calculate the width and the height of respective keys for arranging keys allocated within a range and an interval between keys, and may determine a corresponding key arrangement. This enables the controller 140 to configure the virtual user keypad 230 according to the determined key arrangement.

When a given time set in the state shown in reference numeral 207 elapses or when the user confirms, the controller 140 may display the finally decided user keypad 250, as shown in reference numeral 209, through the two classified areas.

The controller 140 may store relevant setting information about the user keypad 250 configured as described above. For example, the controller 140 may store various setting information relating to the range information of the left side, the range information of the right side, the key arrangement information according to the left side range, the key arrangement information according to the right side range, the keypad type information which is set in the left side, and the keypad type information which is set in the right side.

Figure 3:
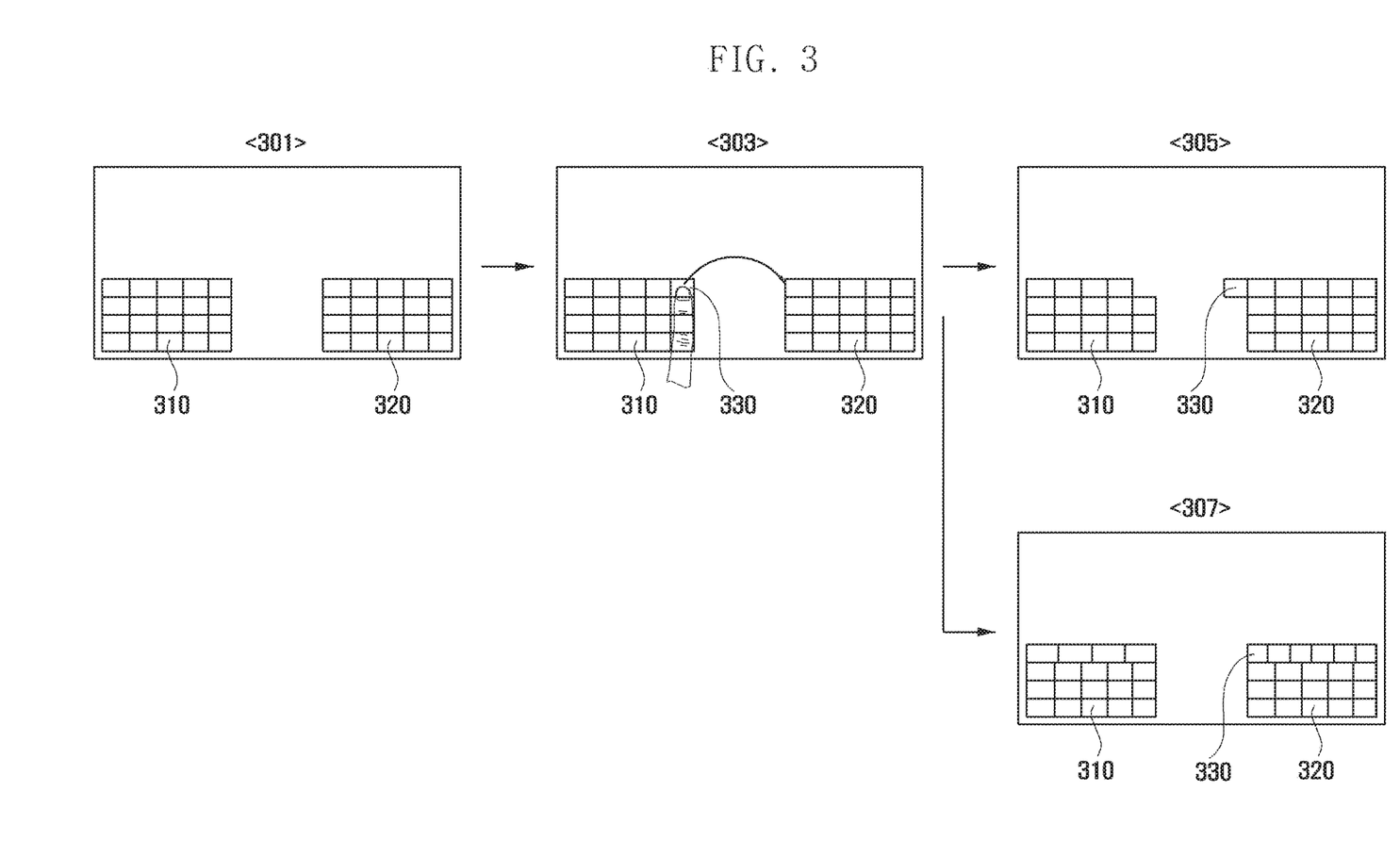
FIG. 3 illustrates an operation of rearranging a key of user keypad in a mobile terminal according to an exemplary embodiment of the present invention.

FIG. 3 illustrates an operation of rearranging a key of user keypad in a mobile terminal according to an exemplary embodiment of the present invention.

Referring to FIG. 3, a touch based user defined user keypad is displayed by the operation of FIG. 2 as shown in reference numeral 301. The user keypad may be displayed as a left keypad 310 and a right keypad 320 through the classified areas of the right side and the left side. As shown in reference numeral 301, the user may arbitrarily set the key arrangement of the left keypad 310 or the right keypad 320. For example, as shown in reference numeral 303, the user may input an interaction of moving a specific key 330 from the left keypad 310 to the right keypad 320.

The user may input an interaction which drags and drops the specific key 330 to a desired location in the right keypad 320. According to the interaction of moving the specific key 330 from the keypad of one area as shown in reference numeral 303 to the keypad of another area as shown in reference numeral 305, the specific key 330 according to the user selection as shown in reference numeral 305 or reference numeral 307 may be arranged in the keypad of the other area according to a setting type as shown in reference numeral 305 or reference numeral 307. For example, as shown in reference numeral 305, the specific key 330 is moved and added while the existing form of the right keypad 320 is maintained such that the specific key 330 is arranged at a point where user interaction is performed. As shown in reference numeral 305, a portion in which the specific key 330 is located in the left keypad 310 may be blank.

Alternatively, as shown in reference numeral 307, the key arrangement of the corresponding line may be reconfigured to include the specific key 330 which is moved and added in the range allocated to the right keypad 320. In this case, the controller 140 may determine a range where the right keypad 320 is allocated, and may perform key arrangement by rearranging an interval of each key of line including the specific key 330 within a corresponding range. As the specific key 330 also comes off in the left keypad 310 as shown in reference numeral 307, the arrangement for the keys of line where the specific key 330 is positioned may be performed.

Similarly, the case of reference numeral 305 and reference numeral 307 may be provided in a mixed form. For example, while the left keypad 310 is maintained as shown in reference numeral 305, the right keypad 320 may rearrange a corresponding line including the added specific key 330 as shown in reference numeral 307.

In FIG. 3, the operation of moving the specific key 330 of the left keypad 310 to the right keypad 320 is illustrated, but exemplary embodiments of the present invention are not limited thereto. The specific key 330 may be moved to an arbitrary location within the left keypad 310 and displayed. Alternatively, while being maintained in the left keypad 310, the specific key 330 may be copied to the right keypad 320, so that the same specific key 330 may be displayed in both of the left keypad 310 and the right keypad 320.

Figure 4:
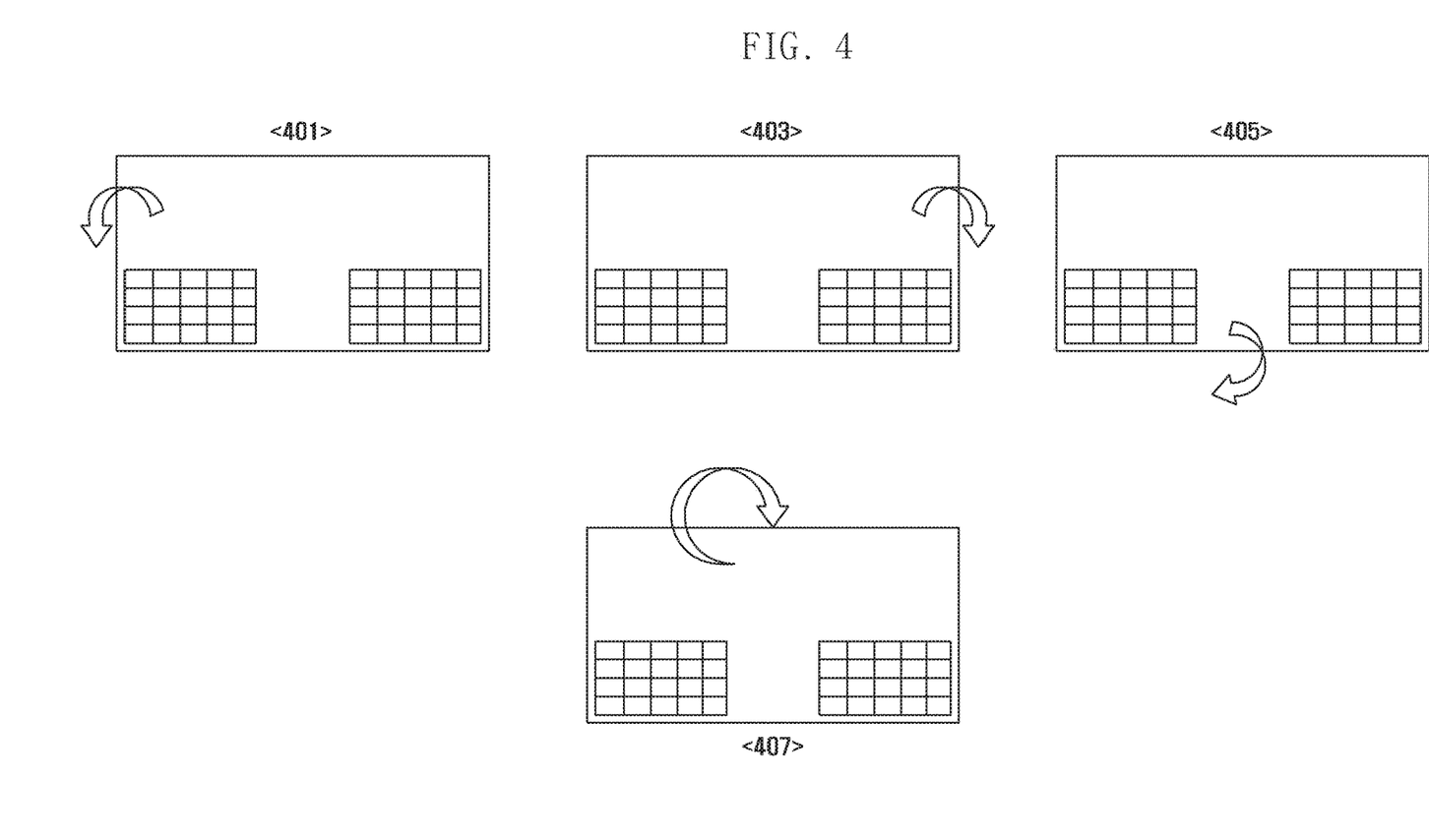
FIG. 4 illustrates an operation supporting a user input using a user keypad and posture information of a mobile terminal according to an exemplary embodiment of the present invention.

FIG. 4 illustrates an operation supporting a user input using a user keypad and posture information of a mobile terminal according to an exemplary embodiment of the present invention.

Referring to FIG. 4, as described above, the user may perform a user input through a user keypad which is generated in response to an input environment of the user. For example, in a text input mode, a character input may be performed through the user keypad. The user may perform the character input using the separately defined posture information change of the mobile terminal, in addition to the character input using the user keypad.

For example, as shown in reference numeral 401, the user may incline the mobile terminal in a left direction during a specific user input (e.g., character input). The controller 140 detects the posture information change of the mobile terminal, and may determine the change direction of the detected posture information. The controller 140 may execute a function mapped to the determined posture information. For example, the left inclination may correspond to a back-space function.

As shown in reference numeral 403, the user may incline the mobile terminal to the right side during a specific user input (e.g., character input). The controller 140 may execute a function mapped to corresponding posture information upon detecting the posture information change of the mobile terminal and determining the direction of the posture information change. The right inclination may correspond to a space function.

As shown in reference numeral 405, the user may tilt the mobile terminal downward during a specific user input (e.g., character input). The controller 140 may execute a function mapped to the corresponding posture information upon detecting the posture information change of the mobile terminal and determining the direction of the posture information change. The downward tilt may correspond to an enter function.

As shown in reference numeral 407, the user may tilt the mobile terminal the upward during a specific user input (e.g., character input). The controller 140 may execute the function mapped to corresponding posture information upon detecting the posture information change of the mobile terminal and determining the direction of the posture information change. The upward tilt may correspond to a menu (e.g., menu for font setting) function.

Although not shown in FIG. 4, a mobile terminal according to exemplary embodiments of the present invention may further include a component to detect posture information when performing operations described above with respect to FIG. 4. For example, the mobile terminal may include a gyro sensor or an acceleration sensor.

A key corresponding to a function mapped to the posture information may be omitted in a user customized keypad according to an exemplary embodiment of the present invention when supporting the user input using the posture information. For example, when a function such as back space, space, enter, and menu is mapped according to posture information as shown in FIG. 4, corresponding keys (e.g., back space, space, enter, and menu) may be omitted from the user keypad. Accordingly, an interval between keys configuring the user keypad may be expanded or an additional application for new keys may be possible. If the posture information as described above is maintained for a certain time, the relevant function may be repeated. For example, when the inclination to the left direction of the mobile terminal is maintained for a certain time, the back space function can be executed repeatedly as long as the corresponding posture information (e.g. left inclination) is maintained.

Figure 5:
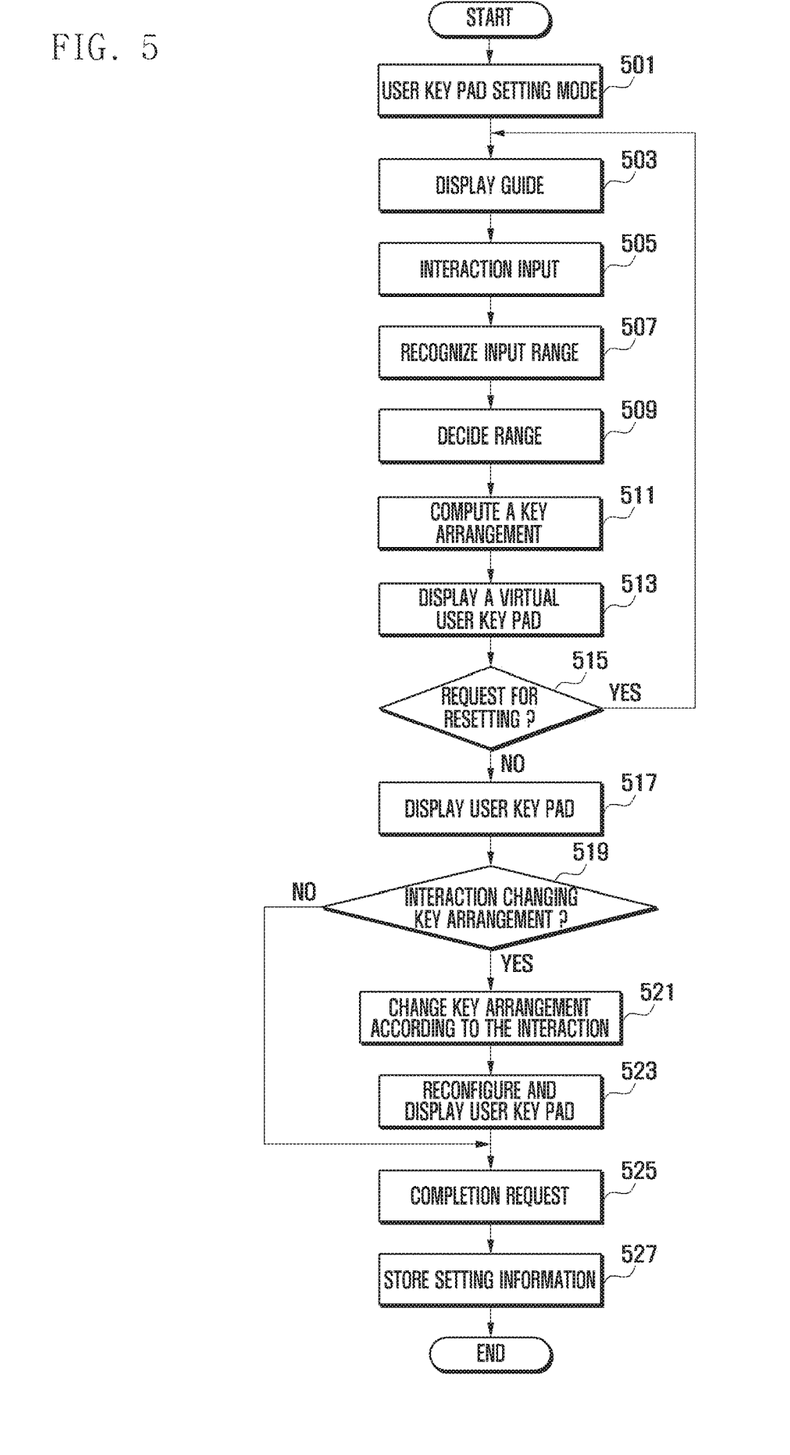
FIG. 5 is a flowchart illustrating a method for providing a user defined user keypad in a mobile terminal according to an exemplary embodiment of the present invention.

FIG. 5 is a flowchart illustrating a method for providing a user defined user keypad in a mobile terminal according to an exemplary embodiment of the present invention.

Referring to FIG. 5, the controller 140 executes a user keypad setting mode in response to a user request in step 501. As described in FIG. 2, the controller 140 displays guide information in the execution of the user keypad setup mode in step 503. When interaction for range designation of the user is inputted after the guide information is displayed in step 505, the controller 140 recognizes a range according to the interaction in step 507 and determines a final range for the configuration of the user keypad in step 509. For example, the controller 140 may trace the movement route of interaction and draw a virtual line according to the traced route to compute a rectangular area, so that the range for the configuration of the user keypad may be determined.

The controller 140 computes a key arrangement for respective keys to configure the user keypad in the determined range in step 511. For example, the controller 140 may recognize the range designated according to the interaction, and compute a key arrangement which can be configured in the recognized range. The controller 140 calculates the width, the height, and the interval of each key of the user keypad so as to configure the user keypad within a range and determine a corresponding key arrangement. This process includes determining an arrangement for keys of the user keypad so that the user keypad can be included within the determined range.

The controller 140 configures and displays a virtual user keypad through the determined range in step 513. A virtual keypad may be temporarily provided within the determined range in step 513, to permit the user to confirm the configuration. Accordingly, step 513 may be omitted.

The controller 140 may determine whether a request for resetting exists in step 515. For example, when the virtual user keypad provided within the range is configured differently from the user's purpose and displayed, the user can request a resetting. Similarly, when the virtual user keypad provided within the range is configured to coincide with the user's purpose and displayed, the user may determine the use of the corresponding user keypad. When a given time elapses after the virtual user keypad is provided or when the user confirms, the controller 140 may recognize, without the resetting request, that the user keypad setting is based on the virtual user keypad.

When resetting is requested (YES of step 515), the controller 140 returns to step 503 and may control the next operation. When resetting is not requested (NO of step 515), the controller 140 configures the user keypad having a key arrangement which is finally decided based on the virtual user keypad, and displays the user keypad in step 517.

The controller 140 determines whether an interaction input which changes key arrangement exists in step 519. For example, as described in FIG. 3, the user may input (e.g., drag and drop) the interaction of moving or copying a specific key of the user keypad to another location. The controller 140 proceeds to step 525 when the input of key arrangement change interaction does not exist (NO of step 519 When the input of key arrangement change interaction exists (YES of step 519), the controller 140 changes the key arrangement according to the interaction in step 521, and accordingly, reconfigures and displays the user keypad in step 523. An example of such operation is illustrated in FIG. 3.

When the completion of user keypad setting is requested in step 525, the controller 140 may store relevant setting information about the user keypad configured by the above described operation in step 527. For example, the controller 140 may store various setting information relating to range information of the left side, range information of the right side, key arrangement information according to the left side range, key arrangement information according to the right side range, keypad type information which is set in the left side, and keypad type information which is set in the right side.

Figure 6:
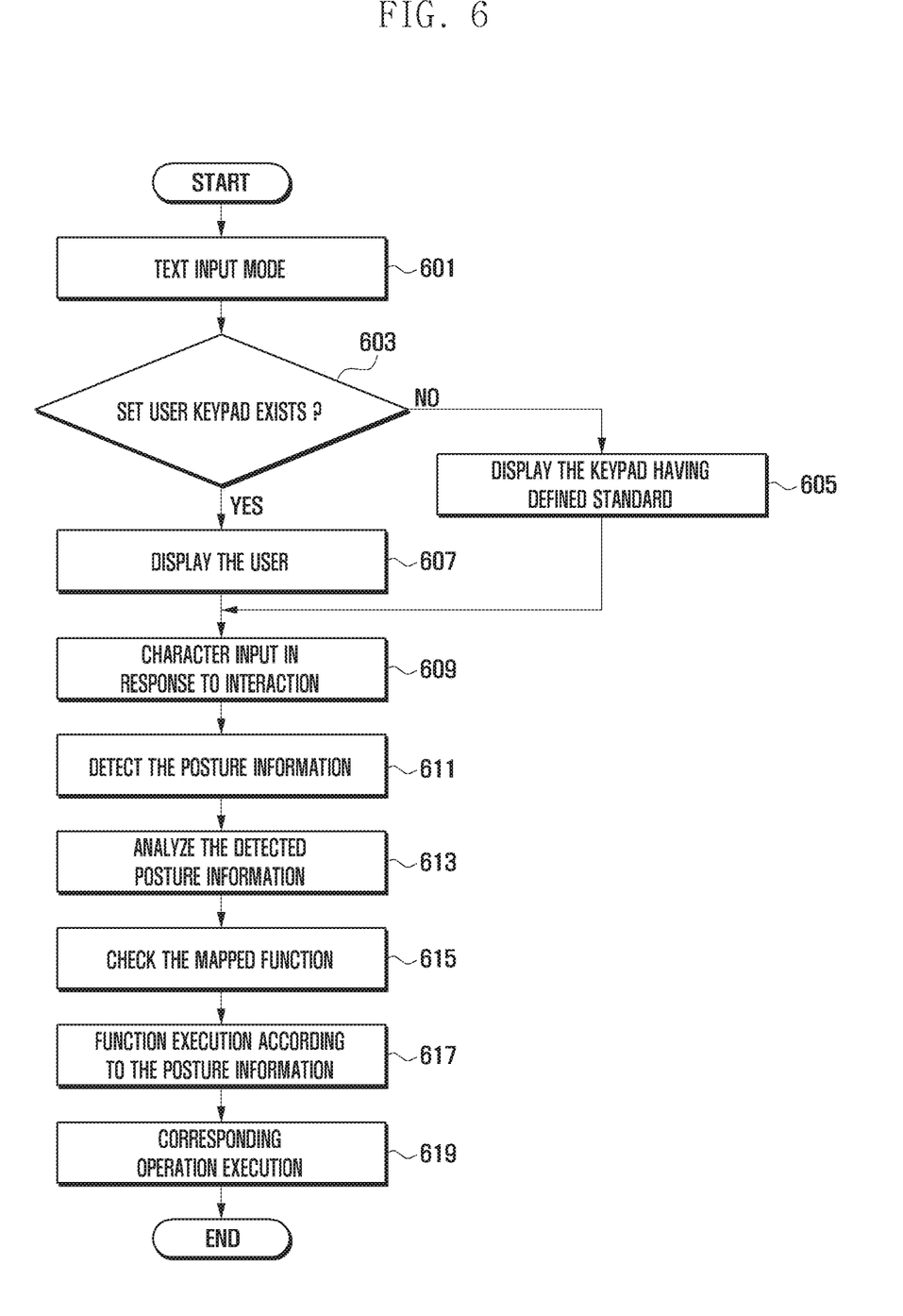
FIG. 6 is a flowchart illustrating a method for operating a user keypad when using the user defined user keypad in a mobile terminal according to an exemplary embodiment of the present invention.

FIG. 6 is a flowchart illustrating a method for operating a user keypad when using the user defined user keypad in a mobile terminal according to an exemplary embodiment of the present invention.

Referring to FIG. 6, the controller 140 operates a text input mode in response to the request of the user in step 601. The controller 140 determines whether a set user keypad exists in step 603. When a set user keypad does not exist (NO at step 603), the controller displays the user keypad having a standard defined in the mobile terminal on a given area in step 605. When a set user keypad exists (YES at step 603), the controller 140 displays the user keypad generated by a user definition in a location within a designated range in step 607. Hereinafter, the user keypad having the defined standard, and the user keypad generated by the user definition are both denoted as "user keypad".

The controller 140 processes the character input in response to a user interaction using the user keypad in step 609. The controller 140 detects posture information indicating that the posture of the mobile terminal is changed as the mobile terminal inclines or tilts to a pre-defined direction while the controller 140 processes the user keypad based character input in step 611. The controller 140 analyzes the detected posture information in step 613, and determines the function mapped to corresponding posture information in step 615. The controller 140 controls the function execution according to the posture information in step 617.

For example, as described in FIG. 4, the controller 140 may control back space function execution mapped to the posture information in response to the left inclination, control space function execution mapped to the posture information in response to the right inclination, control enter function execution mapped to the posture information in response to the downward tilt, or control menu function execution mapped to the posture information in response to the upward tilt.

The controller 140 controls corresponding operating performance after the function execution according to the posture information in step 619. For example, the controller 140 may process operating performance according to a character input by user using user keypad. Similarly, the controller 140 may repeatedly execute the corresponding function mapped to the posture information when the corresponding posture information is maintained even after the function execution corresponding to the posture information. For example, the controller 140 may repeatedly execute the back space function mapped to the posture information corresponding to the left inclination while the mobile terminal maintains a leftward inclination.

Figure 7:
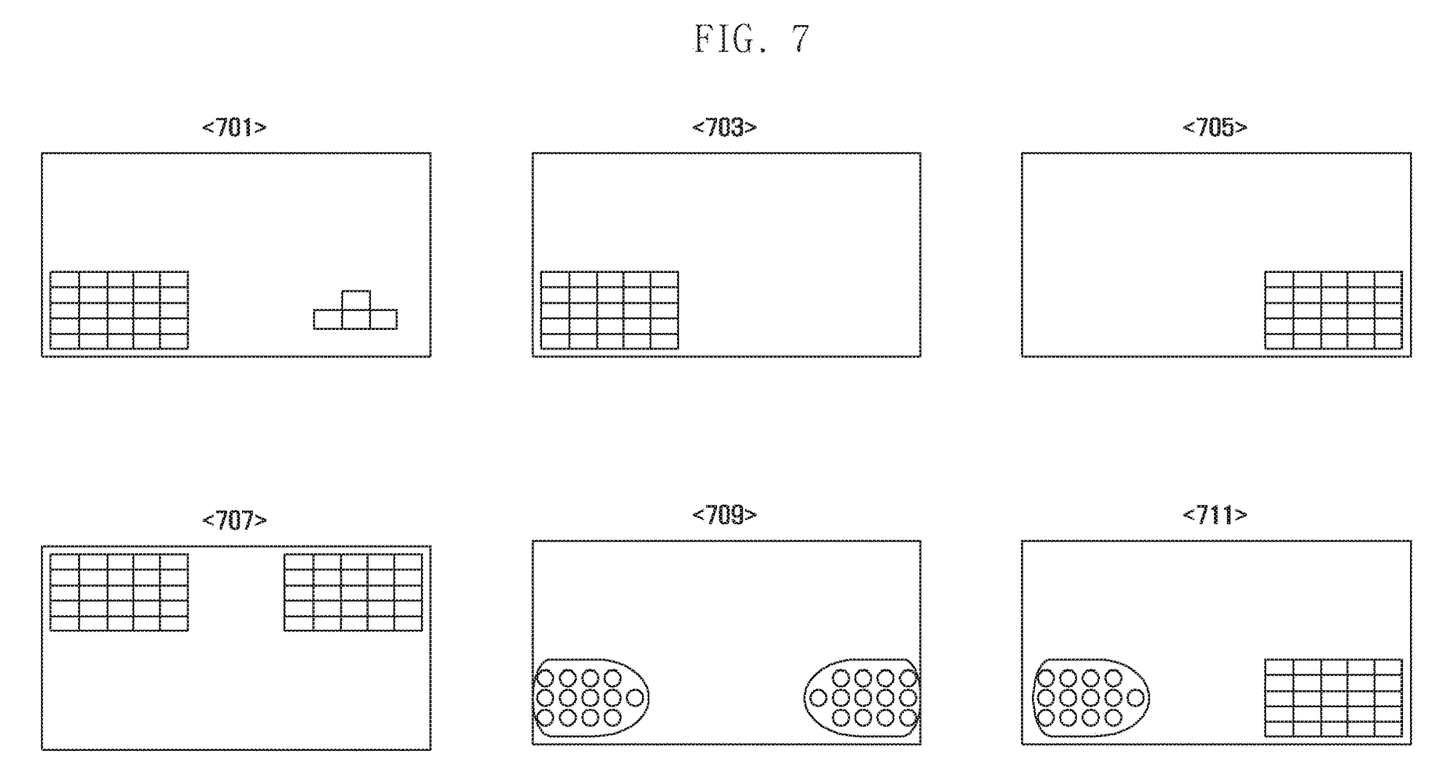
FIG. 7 is a drawing illustrating a user keypad supported by a mobile terminal according to an exemplary embodiment of the present invention.

FIG. 7 is a drawing illustrating a user keypad supported by a mobile terminal according to an exemplary embodiment of the present invention.

Referring to FIG. 7, the user may include a user customized keypad corresponding to the user's input environment through the above described operation. According to an exemplary embodiment of the present invention, a user keypad may be configured according to the input environment of the user such as both hands of the user, the holding state of the mobile terminal, the size of the user's hand (e g, hand size, finger length, or the like). Additionally, the user keypad may provide not only a single keypad structure composed of one type, but also a composite keypad structure composed of a combination of at least two kinds of types which are different one another.

The user may set a user keypad with various types of keypad combinations. For example, as shown in reference numeral 701, a keypad having a native language keyboard may be set on the left side, and a keypad having a direction key may be set on the right side. The user keypad may be set by various combinations of the native language keyboard, the foreign language keyboard, the calculator keyboard, the character keyboard, the number keyboard, other keyboards, or user-designed keyboards.

The user may set a user keypad using a specific given area. For example, a user keypad which uses only the left side may be set as shown in reference numeral 703, or a user keypad which uses only the right side can be set as shown in reference numeral 705. The user may arrange and set the user keypad on a desired location. For example, as shown in reference numeral 707, the user may arrange and display the user keypad using the upper area. The user can set the user keypad in various shapes, such as a polygon (e.g., ellipse, or the like), in addition to the user keypad of the above described rectangular type. For example, as shown in reference numeral 709, an elliptical keypad may be set. Additionally, as shown in reference numeral 711, the user keypad can be set by a combination of the square and polygon.

Although not shown in FIG. 7, various types of user keypads similar to those shown in reference numerals 701 to 711 may be stored according to a user definition. The user may create a user keypad according to application type. Accordingly, an optimized user customized-keypad may be provided for any application in the mobile terminal. For example, when an application which frequently uses the native language input is executed, a keypad configured as a native language keyboard may be used. When space utilization is needed, a keypad which is configured only in one side may be used such as those shown in reference numeral 703 and reference numeral 705.

When an application which frequently uses a number input is executed, a keypad configured of the number keyboard may be used. Also, when a calculator function is needed, a keypad configured of a calculator keyboard may be used. When an application like a game is executed, a keypad configured of a direction key may be used as shown in reference numeral 701.

As described above, according to exemplary embodiments of the present invention, the optimized user keypad may be set for any application of the mobile terminal. Accordingly, the convenience of user input may be improved in using the mobile terminal.

The method of providing a user customized user keypad may be implemented in the form of a program command executable by various computer means and recorded in a non-transitory computer readable recording medium. In this case, the computer readable recording medium may include a program command, a data file, and a data structure individually or a combination thereof. The program command recorded in a recording medium may be specially designed or configured for exemplary embodiments of the present invention or be known to a person having ordinary skill in a computer software field to be used.

The computer readable recording medium includes Magnetic Media such as hard disk, floppy disk, or magnetic tape, optical media such as Compact Disc Read Only Memory (CD-ROM) or Digital Versatile Disc (DVD), magneto-optical media such as floptical disk, and a hardware device such as ROM, RAM, and flash memory storing and executing program commands. Further, the program command includes a machine language code created by a complier and a high-level language code executable by a computer using an interpreter. The foregoing hardware device may be configured to be operated as at least one software module to perform an operation of the present invention, and a reverse operation thereof is the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile device comprising:
   a display;
   a sensor; and
   at least one processor configured to:
   identify, via the sensor, an orientation of the mobile device,
   display, on the display, a user keypad in a first configuration in which the user keypad is a single keypad having a plurality of keys grouped together in a region of the display of the mobile device,
   determine whether the mobile device is in a landscape mode based on the identified orientation of the mobile device identified by the sensor,
   display, in response to receiving a user input for rearranging the user keypad and determining that the mobile device is in the landscape mode, the user keypad in a second configuration in which the user keypad is split into two parts, wherein the two parts comprise a first part of the user keypad that is located closer to a first lateral edge of the mobile device than a second lateral edge of the mobile device and a second part of the user keypad that is located closer to the second lateral edge than the first lateral edge,
   receive a user input for rearranging one of the plurality of keys of the user keypad,
   based on receiving the user input for rearranging one of the plurality of keys, rearrange the second part of the user keypad in the second configuration to include the one of the plurality of keys of the first part to cause the user keypad to change from the first configuration to the second configuration, and
   display, on the display, the user keypad in the second configuration in which the first part and the second part are in a split state,
   wherein a position of another key in the second part of the user keypad in the second configuration is modified according to a position or a size of the one of the plurality of keys moved to the second part from the first part.

2. The mobile device of claim 1, wherein the at least one processor is further configured to:
   receive a request for displaying the user keypad while an application is executed, and display the user keypad using one of the first configuration, the second configuration or a third configuration according to the executed application, the third configuration being different from the first configuration, and the second configuration.

3. The mobile device of claim 1, wherein the user input for the rearranging of the one of the plurality of keys is a drag input starting from a first position where the one of the plurality of keys is displayed to a second position where the one of the plurality of keys is to be displayed, the second position being in the second part of the user keypad.

4. The mobile device of claim 1, wherein the first part of the user keypad comprises a first key and the second part of the user keypad comprises a second key, the first key and the second key corresponding to a same function.

5. The mobile device of claim 1,
wherein the at least one processor is further configured to receive a selection of a keypad setting mode of the mobile device, and
wherein a size and a location of the user keypad are set by a user in the keypad setting mode.

6. The mobile device of claim 1,
wherein the mobile device further comprises:
a memory configured to store related setting information for the user keypad, and
wherein the memory is further configured to:
store the related setting information by storing setting information related to key arrangement information according to the first configuration, the second configuration and type information of the user keypad.

7. The mobile device of claim 1, wherein the at least one processor is further configured to:
display the rearranged user keypad in the second configuration such that the rearranged one of the plurality of keys is displayed in the second part of the user keypad in the second configuration.

8. The mobile device of claim 1, wherein a size or a location of another key in the first part is modified according to the one of the plurality of keys moved to the second part from the first part.

9. A mobile device comprising:
a display; and
at least one processor configured to:
display, on the display, a user keypad in a first configuration in which the user keypad is split into two parts, wherein the two parts comprise a first part of the user keypad that is located closer to a first lateral edge of the mobile device than a second lateral edge of the mobile device and a second part of the user keypad that is located closer to the second lateral edge than the first lateral edge,
receive a user input for rearranging one of a plurality of keys of the user keypad,
based on receiving the user input, rearrange the second part of the user keypad in the first configuration to include the one of the plurality of keys of the first part to cause the user keypad to change from the first configuration to a second configuration, and
display the user keypad in the second configuration in which the first part and the second part are in a split state,
wherein a position of another key in the second part of the user keypad of the second configuration is modified according to a position or a size of the one of the plurality of keys moved to the second part from the first part.

10. The mobile device of claim 9, wherein the at least one processor is further configured to:
receive a request for displaying the user keypad while an application is executed, and
display the user keypad using one of the first configuration, the second configuration or a third configuration according to the executed application, the third configuration being different from the first configuration, and the second configuration.

11. The mobile device of claim 9, wherein the user input for the rearranging of the one of the plurality of keys is a drag input starting from a first position where the one of the plurality of keys is displayed to a second position where the one of the plurality of keys is to be displayed, the second position being in the second part of the user keypad.

12. The mobile device of claim 9, wherein the first part of the user keypad comprises a first key and the second part of the user keypad comprises a second key, the first key and the second key corresponding to a same function.

13. The mobile device of claim 9,
wherein the at least one processor is further configured to receive a selection of a keypad setting mode of the mobile device, and
wherein a size and a location of the user keypad are set by a user in the keypad setting mode.

14. The mobile device of claim 9,
wherein the mobile device further comprises:
a memory configured to store related setting information for the user keypad, and
wherein the memory is further configured to:
store the related setting information by storing setting information related to key arrangement information according to the first configuration, the second configuration and type information of the user keypad.

15. The mobile device of claim 9, wherein a size or a location of another key in the first part is modified according to the one of the plurality of keys moved to the second part from the first part.

16. A method of providing a user keypad in a mobile terminal, the method comprising:
displaying, on a display, the user keypad in a first configuration in which the user keypad is split into two parts, wherein the two parts comprise a first part of the user keypad that is located closer to a first lateral edge of the mobile terminal than a second lateral edge of the mobile terminal and a second part of the user keypad that is located closer to the second lateral edge than the first lateral edge;
receiving a user input for rearranging one of a plurality of keys of the user keypad;
based on receiving the user input, rearranging the second part of the user keypad in the first configuration to include the one of the plurality of keys of the first part to cause the user keypad to change from the first configuration to a second configuration; and
displaying the user keypad in the second configuration in which the first part and the second part are in a split state,
wherein a position of another key in the second part of the user keypad is modified according to a position or a size of the one of the plurality of keys moved to the second part.

17. The method of claim 16, further comprising:
receiving a request for displaying the user keypad while an application is executed; and
displaying the user keypad using one of the first configuration, the second configuration or a third configuration according to the executed application, the third configuration being different from the first configuration, and the second configuration.

18. The method of claim 16, wherein the user input for the rearranging of one of the plurality of keys is a drag input starting from a first position where the one of the plurality of keys is displayed to a second position where the one of the plurality of keys is to be displayed, the second position being in the second part of the user keypad.

19. The method of claim 17, wherein the first part of the user keypad comprises a first key and the second part of the user keypad comprises a second key, the first key and the second key corresponding to a same function.

20. The method of claim 16, further comprising:
receiving a selection of a keypad setting mode of the mobile terminal,
wherein a size and a location of the user keypad are set by a user in the keypad setting mode.

21. The method of claim 16, wherein a size or a location of another key in the first part is modified according to the one of the plurality of keys moved to the second part from the first part.

22. A mobile device comprising:
a display;
a sensor; and
at least one processor configured to:
identify, via the sensor, an orientation of the mobile device,
display, on the display, a user keypad in a first configuration in which the user keypad including a plurality of keys is a single keypad having a plurality of keys grouped together in a region of the display of the mobile device,
display, in response to receiving a user input for rearranging the user keypad while the mobile device is in a landscape state, the user keypad in a second configuration in which the user keypad is split into two parts, wherein the two parts comprise a first part of the user keypad that is located closer to a first lateral edge of the mobile device than a second lateral edge of the mobile device and a second part of the user keypad that is located closer to the second lateral edge than the first lateral edge,
receive a user input for rearranging one of the plurality of keys of the user keypad,
based on receiving the user input for rearranging one of the plurality of keys, rearrange the second part of the user keypad in the second configuration to include the selected one of the plurality of keys of the first part, and
based on rearranging of the first part and second part of the user keypad, display the user keypad in the second configuration in which the first part and the second part are in a split state,
wherein a position of another key in the second part and a size of another key in first part of the user keypad are modified according to a position or a size of the selected one of the plurality of keys moved to the second part from the first part.

23. The mobile device of claim 22, wherein the at least one processor is further configured to:
determine whether the mobile device is in a landscape mode based on the detected orientation of the mobile device detected by the sensor, and
perform the displaying of the user keypad based at least in part on a determination that the mobile device is in a landscape mode.

24. The mobile device of claim 22, wherein the at least one processor is further configured to:
perform the displaying of the user keypad such that the other key in the first part is displayed in a first size, and
display the other key in the first part according to the position or the size of the selected one of the plurality of keys moved to the second part from the first part such that the other key is displayed in a second size larger than the first size.

25. The mobile device of claim 22, wherein a position of the other key in the first part is modified according to the one of the plurality of keys moved to the second part from the first part.

* * * * *